United States Patent [19]

von Bogdandy et al.

[11] Patent Number: 4,925,489
[45] Date of Patent: May 15, 1990

[54] PROCESS FOR MELTING SCRAP IRON, SPONGE IRON AND/OR SOLID PIG IRON

[75] Inventors: Ludwig von Bogdandy, Linz; Gerhard Mitter, Traun; Otto Köller, Leoben, all of Austria

[73] Assignee: Voest-Alpine Stahl Donawitz Gesellschaft m.b.H., Leoben-Donawitz, Austria

[21] Appl. No.: 234,550

[22] Filed: Aug. 22, 1988

[30] Foreign Application Priority Data

Aug. 21, 1987 [AT] Austria .................................. 2101/87

[51] Int. Cl.⁵ .......................................... C21B 11/00
[52] U.S. Cl. ................................................... 75/574
[58] Field of Search ................ 75/30, 43, 44 R, 44 S, 75/48, 257

[56] References Cited

U.S. PATENT DOCUMENTS

| | | | |
|---|---|---|---|
| 2,546,936 | 3/1951 | Vignos | 75/30 |
| 3,772,000 | 11/1973 | Hyde et al. | 75/48 |
| 3,982,926 | 9/1976 | Geck et al. | 75/44 S |
| 4,001,008 | 1/1977 | Stift | 75/48 |
| 4,203,761 | 5/1980 | Rose | 75/92 |
| 4,556,418 | 12/1985 | Syska | 75/44 S |

*Primary Examiner*—Melvyn J. Andrews
*Attorney, Agent, or Firm*—Cushman, Darby & Cushman

[57] ABSTRACT

For the purpose of melting scrap iron, pelletized sponge iron in reduced condition, solid pig iron or the like, there is introduced into the melting heat from below a charge-accepting receptacle by means of burners the carbon content within the molten bath is adjusted by a sub-stoichiometric combustion of hydrocarbon. Addition of any coal to the charged material is avoided. By reducing the oxygen flow, in particular by performing the combustion with approximately 0.9-times of the stoichiometric amount of oxygen, and by optionally adding slag formers, the aggressivity of the slag in relation to the furance lining is simultaneously reduced.

6 Claims, 1 Drawing Sheet

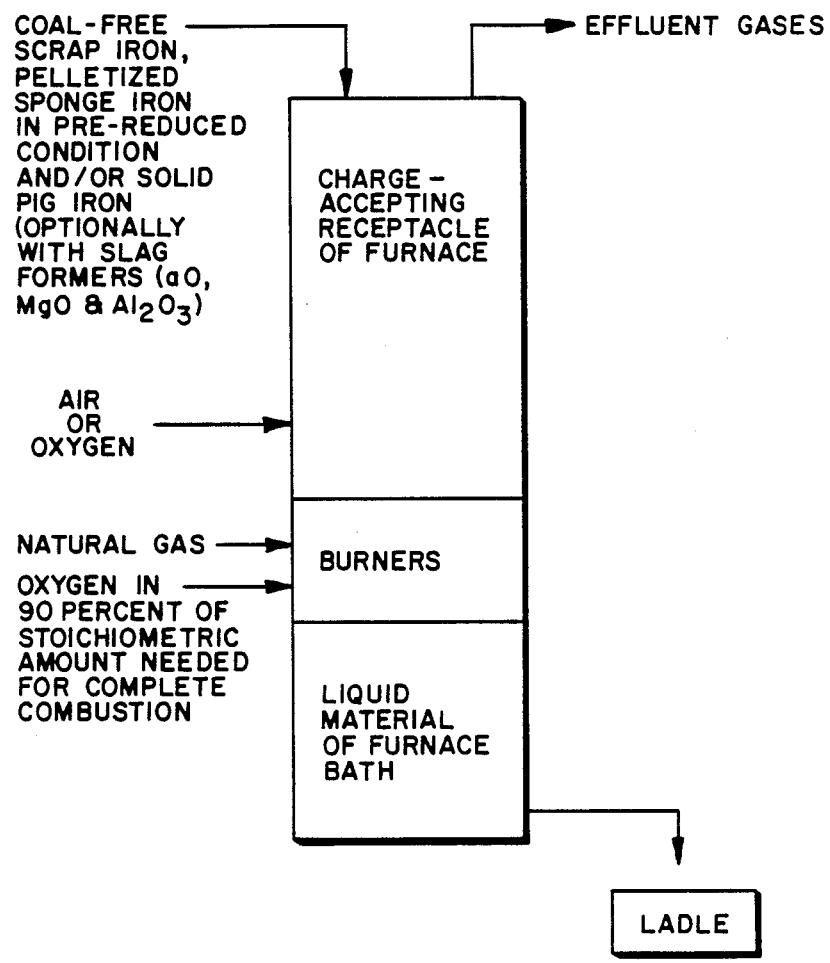

PROCESS FOR MELTING SCRAP IRON, SPONGE IRON AND/OR SOLID PIG IRON

BACKGROUND OF THE INVENTION

1. Field of the Invention

The invention refers to a process for melting scrap iron, pelletized sponge iron in pre-reduced condition and/or solid pig iron for the purpose of producing steel, in which process the melting heat is introduced into a charge contained in a receptacle, from below the charge by means of burners and the resulting liquid material discharged from the melting receptacle is collected in a ladle, in which there are, if required, performed further alloying steps.

2. Description of the Prior Art

From DE-AS 25 04 889 there has already become known a process for continuously melting scrap iron, iron sponge or the like, in which process a carburization of the bath should be achieved by adding to the charge big coal lumps of low reactivity below the oxidizing melting zone. On account of the oxidizing flame of usual fuel-oxygen-burners, the charged materials become oxidized in an undesired manner, and there were made several proposals to prevent such oxidation or to reduce at least the degree of such oxidation. In this connection, there has, for example, been proposed in AT-PS 363 503 to blow coal dust onto the bath together with the effluent gases of the combustion. When adding coal to the charge, there results, in particular, in shaft furnaces of high construction, most frequently the drawback that a considerable portion of the added coal is burned within the furnace shaft together with the flame gases and is, for this reason, only effective at a reduced degree within the melting area. Introducing carbon at the bottom of the melting receptacle, by blowing, for the purpose of carburizing the bath requires, as a rule, additional heating means within the area of the bottom. Carbon being blown into the bath results in a further desoxidation of the melt, which desoxidation may result in undesired excessive boiling reactions. Likewise, a relatively high degree of inhomogeneity possibly resulting in an excessive local boiling reaction may be observed within the bath when charging corresponding big coal lumps which subsequently shall pass through the melting zone and shall become effective within the bath.

It is in particular in case of melting furnaces of small size that the charge passes the furnace within a relatively short time interval. Within such a short time interval, no complete reaction of lumpy coal may be expected in contrast to the conditions existing, for example, within a blast furnace. A great portion of the equally supplied carbon, for example being supplied in the shape of coke, would rather scarcely be changed within the downwardly travelling column until the flame area and would be substantially burned within the flame burning by supplying oxygen.

With consideration of the excessive oxidation when using fuel-oxygen-burners, there was, as a rule, charged coal in the melting processes known up till now, and this for the purpose to keep low the iron losses resulting from a high content in iron oxides of the slag. A high content of the slag in iron oxides results in the additional drawback that such a relatively aggressive slag attacks the furnace cladding in an excessive degree and thus reduces the lifetime of the refractory cladding.

SUMMARY OF THE INVENTION

The invention now aims at providing a process of the initially mentioned type allowing to adjust a corresponding carbon content in a homogeneous molten bath without thereby producing a slag containing an excessive proportion of iron oxides. For solving this task, the invention essentially consists in that the charge is introduced without the addition of coal and in that the melting heat is provided by a sub-stoichiometric combustion of hydrocarbons, in particular natural gas, and in that the desired carbon content of the bath is adjusted by reducing the oxygen flow during the combustion. On account of the charge being introduced without the addition of coal, the combustion within the combustion zone and thus the temperature within the melting zone can more exactly be controlled and local excessive boiling reactions within the bath, which might be provoked by coal lumps, can reliably be avoided. On account of performing the combustion in a sub-stoichiometric manner by adjusting a reduced flow of oxygen, a carbon content in form of extremely fine-distributed carbon black may reliably be established within the burner plane, the carbon black being suitable to become rapidly and homogeneously dissolved within the bath. The control of the oxygen flow may, in this case, immediately be utilized for adjusting the desired carbon content within the bath. The uniform and homogeneous distribution of the carbon within the bath results simultaneously in a higher purity of the melt and on account of omitting any addition of carbon, other desired metallurgical process steps can more exactly be controlled. The process according to the invention provides, in particular, the possibility to simultaneously perform a desulfurizing step or a dephosphorizing step by adding suitable slagging agents.

Advantageously, the process according to the invention is performed such that the combustion is performed with approximately 0.9-times the stoichiometric amount of oxygen.

For the purpose of performing metallurgical operations, such as desulfurizing and dephosphorizing, it is advantageous to add slag formers such as CaO or MgO. According to the invention, the procedure is advantageously such that slag formers, such as CaO, MgO and $Al_2O_3$ are charged together with the charging materials to be made molten. These slag formers provide, together with the desired metallurgical reaction the advantage that the aggressivity of the slag can be reduced to the desired extent. For the purpose of reducing the aggressivity of the slag it is sufficient to reduce its content in iron oxides down to 40 to 60 percent; which is achieved by corresponding additions to CaO, MgO and $Al_2O_3$. The addition of CaO and MgO results on account of the strongly basic nature of these added materials beside in a desulfurization and in a dephosphorization in a substantial neutralization of the slag, whereas the added $Al_2O_3$ behaves within the slag in a substantially neutral manner and thus becomes effective like a diluent. As a whole, such added materials provide for a substantial reduction of the FeO-content of the slag and thus for a substantial reduction of the aggressivity of the slag.

In a particularly preferred manner, the process is performed such that a slag is adjusted which contains 10 to 30 percent $SiO_2$, 3 to 0.5 percent MnO, 7 to 8 percent $Al_2O_3$, 5 to 6 percent CaO, 7 to 8 percent MgO, 3 to 4 percent $Cr_2O_3$ and up to 5 percent usual contaminations, the residue being FeO. By such a slag control, the aggressivity of the slag is pronouncedly reduced.

For the purpose of improving the energy utilization, it is, within the scope of the process according to the invention, of advantage to introduce, for the purpose of completely burning the effluent gases, air above the burner planes, in particular approximately at half of the height of the melting receptacle. On account of such a complete combustion of the effluent gases, it becomes possible to transfer the generated additional energy to scrap iron, noting that the required combustion air or, respectively, amount of oxygen may be blown via a row of nozzles located above the burners.

BRIEF DESCRIPTION OF THE DRAWING

In the Drawing:

The FIGURE is a schematic representation of apparatus for carrying out the process of the present invention.

DETAILED DESCRIPTION OF THE PREFERRED EMBODIMENTS

In the following, the invention is further explained with reference to examples.

EXAMPLE 1

For the purpose of melting scrap iron, the burners were adjusted to a stoichiometric factor $\lambda = 1$ and a slag was adjusted which contains 10 percent $SiO_2$, 3 percent MnO, 7 percent $Al_2O_3$, 5 percent CaO, 7 percent MgO, 3 percent $Cr_2O_3$ and up to 5 percent usual contaminations. The content of the FeO in the slag was determined to be 60 to 65 percent.

EXAMPLE 2

Maintaining a sub-stoichiometric factor $\lambda = 0.8$ to 0.9, i.e. 80 to 90 percent of the stoichiometric amount of oxygen required for complete combustion of the natural gas is supplied to the burners slag formers were added for obtaining a slag having the composition of 30 percent $SiO_2$, 3.5 percent MnO, 8 percent $Al_2O_3$ 6 percent CaO, 8 percent MgO and 4 percent $Cr_2O_3$. The FeO-content was determined to be 40 to 50 percent, indicating that the yield in Fe was distinctly improved and that the aggressivity of the slag was distinctly reduced.

What is claimed is:

1. A process for melting a charge in a charge-accepting receptacle of a furnace above a plane of burners, for producing steel, comprising:
   (a) introducing into the receptacle a coal-free charge including at least one major constituent selected from the group consisting of scrap iron, pelletized sponge iron and solid pig iron;
   (b) introducing heat into said receptacle from below said charge, using burners at said plane of burners, by burning natural gas in an atmosphere containing a sub-stoichiometric amount of oxygen and thereby also introducing finely divided carbon into the resultingly liquified charge material which collects in a furnace bath below said plane of burners; and
   (c) discharging the liquified charge material of the furnace bath into a ladle.

2. The process of claim 1, wherein:
   in conducting step (b), approximately 90 percent of the stoichiometric amount of oxygen required for complete combustion of the natural gas is supplied to said burners.

3. The process of claim 1, wherein:
   said charge further includes at least one slag-former selected from the group consisting of CaO, MgO and $Al_2O_3$.

4. The process of claim 1, wherein:
   sufficient slag-former is added as to provide said furnace bath with a slag which contains:
   $SiO_2$ 10–30 percent
   MnO 3 to 3.5 percent
   $Al_2O_3$ 7 to 8 percent
   CaO 5 to 6 percent
   MgO 7 to 8 percent
   $Cr_2O_3$ 3 to 4 percent
   Usual impurities up to 5 percent
   FeO balance.

5. The process of claim 1, further comprising:
   introducing air or oxygen into the charge-accepting receptacle of the furnace about half way up the height thereof, for more completely burning effluent gases rising therein.

6. The process of claim 1, wherein:
   in conducting step (b), 80 to 90 percent of the stoichiometric amount of oxygen required for complete combustion of the natural gas is supplied to said burners.

* * * * *